United States Patent [19]

Jefferson

[11] Patent Number: 4,697,817

[45] Date of Patent: Oct. 6, 1987

[54] MOTOR VEHICLE STEERING STABILIZING APPARATUS

[76] Inventor: Paul Jefferson, 284 S. Dobson Rd., Chandler, Ariz. 85224

[21] Appl. No.: 853,544

[22] Filed: Apr. 18, 1986

[51] Int. Cl.$^4$ ................................................ B62D 7/08
[52] U.S. Cl. ..................................... 280/94; 280/771; 267/150; 267/195
[58] Field of Search ................... 280/6.11, 772, 267, 280/282, 93, 94; 267/8 R, 150

[56] References Cited

U.S. PATENT DOCUMENTS

| | | | | |
|---|---|---|---|---|
| 1,210,490 | 1/1917 | Kittle | ................... | 280/94 |
| 3,848,885 | 11/1974 | Hefren | ................... | 280/94 |
| 4,213,626 | 7/1980 | Moore | ................... | 280/94 |
| 4,406,473 | 9/1983 | Sexton | ................... | 280/94 |
| 4,603,873 | 8/1986 | Perlini | ................... | 280/94 |

*Primary Examiner*—Richard A. Bertsch
*Attorney, Agent, or Firm*—Harry M. Weiss & Associates

[57] ABSTRACT

The present invention relates to a steering stabilizer which may be used on automobiles, motor homes, trucks, busses or tractor-trailers to provide better steering control by automatically returning the steering wheel to the neutral position after deflection due to a road hazard or a tire blowout.

According to the present invention there is provided a steering stabilizer apparatus having a generally tubular outer casing. Compression spring means is disposed within generally tubular outer casing and internal shaft means passes through the central channel formed by the coil of compression spring means. Compression spring means is preferably a single spring, but may consist of two or more compression coil springs disposed in-line with respect to each other.

22 Claims, 5 Drawing Figures

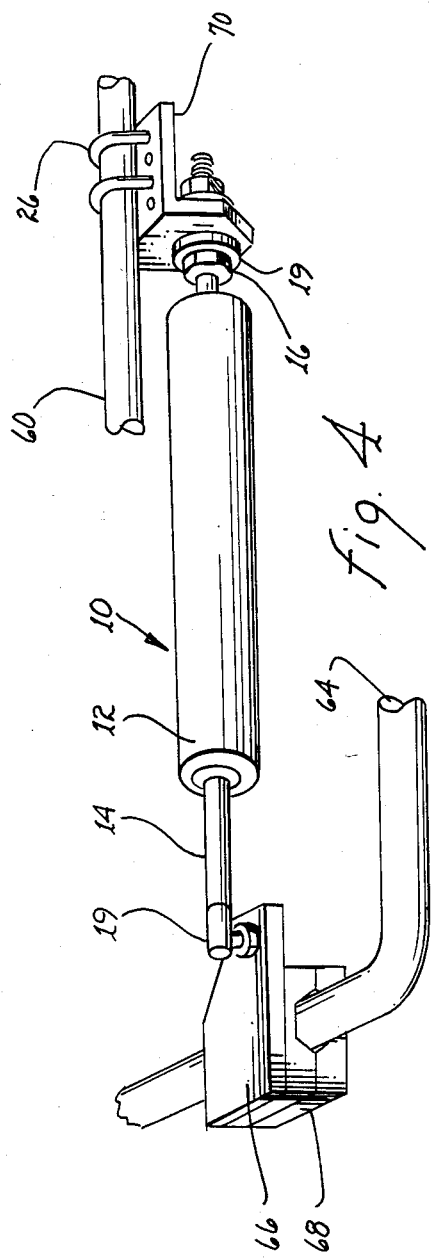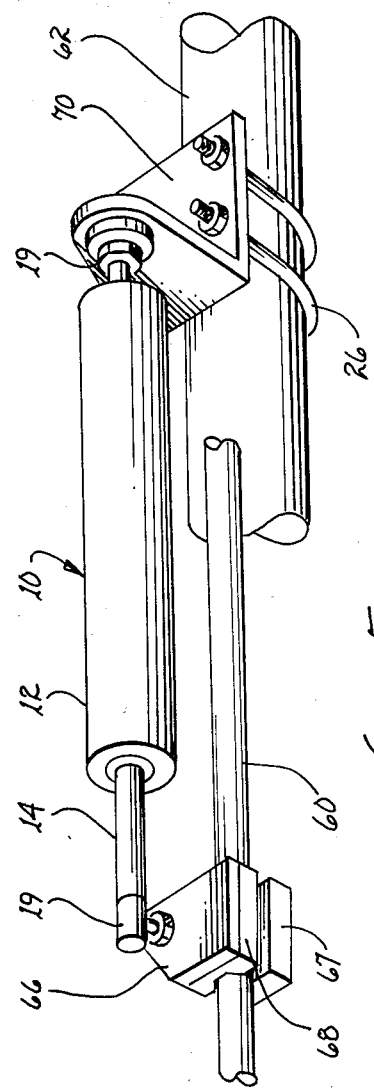

MOTOR VEHICLE STEERING STABILIZING APPARATUS

BACKGROUND OF THE INVENTION

This invention relates generally to a steering stabilizing apparatus for use on most types of motor vehicles. More particularly, the present invention relates to a steering stabilizer which may be used on automobiles, motor homes, trucks, busses or tractor-trailers to provide better steering control by automatically returning the steering wheel to the neutral position after deflection due to a road hazard or a tire blowout.

Conventional steering stabilizer devices are represented by the following United States Letters Patent: U.S. Pat. No. 1,210,490 issued on Jan. 2, 1917 to John A. Kittle; U.S. Pat. No. 3,848,885 issued on Nov. 19, 1974 to Fred W. Hefren; U.S. Pat. No. 4,213,626 issued on July 22, 1980 to George B. Moore and U.S. Pat. No. 4,406,473 issued Sept. 27, 1983 to Tilman L. Sexton. Each of these conventional steering stabilizer devices employs two opposing equal strength biasing coil springs. For example, U.S. Pat. No. 3,848,885 discloses an opposing coil spring arrangement exemplary of conventional steering stabilizer devices. In that patent there is disclosed an apparatus having a fixed plate member point, on an automobile axle, having an aperture through which a shaft member passes. The shaft member supports two coil springs which are retained at each end of the shaft member by a washer and nut-type arrangement. The two coil springs are retained in opposing fashion by the fixed plate member at the center of the shaft member. One end of the shaft member is operably attached in a freely rotatable fashion to a U-bolt plate which is, in turn, attached to the steering linkage located at one wheel of the automobile.

In operation, the conventional steering stabilizer devices increase steering wheel and tire stability by providing increased resistance to axial movement of the shaft member in either longitudinal direction by the compression action of the two opposing springs. These conventional devices, therefore, require that two springs be compressed in opposing fashion in order to provide stabilization. Over a period of time and due to wheel misalignment, a greater frequency of turns in one direction or a multitude of road hazards, one or both of the originally equally biased opposing compression springs will suffer a decreased compression ratio. Once the opposing compression springs become unequally biased or have unequal compression ratios, the ability of the device to stabilize the steering will decrease, the steering will become inaccurate and the vehicle may begin to stray or wander in the direction of the weaker spring thereby increasing the likelihood of a vehicular accident.

It has, therefore, been found desirable to develop a steering stabilizing device which does not rely upon equal biasing of opposing springs, and, accordingly, will not suffer from reduced stabilizing capacity due to time and wear. Further, it has been found desirable to develop a steering stabilizing device which incorporates bracketry enabling easy and rapid attachment of the device to a wide variety of vehicles so that each steerable wheel of the vehicle is neutrally biased in operation. Ideally, it is desirable to provide a steering stabilizing device which is capable of being attached to both single solid axle and independent axle steering systems and to vehicles having a sway bar or a tie rod.

The paramount advantage of the desirable steering stabilizing device lies in its inherent capacity for returning the steering wheel of any vehicle to the neutral position almost immediately after a turn, tire blow-out, road hazard or other steering deflection, and its immunity from the problems of unequal biasing encountered with conventional steering stabilizing devices due to time and wear.

SUMMARY OF THE INVENTION

Accordingly, it is an object of the present invention to provide a stabilizer for the steerable wheels of a motor vehicle which may be directly attached to the steering mechanism of the vehicle.

It is another object of the present invention to provide a steering stabilizing apparatus which is adaptable to a wide variety of vehicles including, but not limited to passenger automobiles, motor homes, buses, trucks, tractor-trailers or heavy construction equipment.

It is yet another object of the present invention to provide a steering stabilizing apparatus which is adaptable to both vehicles having a solid front axle and those having independent dual axle steering systems.

It is still yet another object of the present invention to provide a steering stabilizing apparatus which, in combination with the steering system of a motor vehicle, will bias and maintain the vehicles steering wheels in a neutral steering position.

It is a more particular object of the present invention to provide a steering stabilizing apparatus employing a single spring or multiple, non-opposing, in-line springs thereby insuring a constant and uniform compression ratio over the life of the spring.

It is yet a more particular object of the present invention to provide a steering stabilizing apparatus which will almost instantaneously return the steering wheels of a motor vehicle to the neutral position after encountering a turn, tire blow-out or road hazards.

It is a further object of the present invention to provide a steering stabilizing apparatus for a motor vehicle having bracketry which permits the installation thereof onto the vehicle without the necessity of disassembling the vehicles steering system.

It is yet a further object of the present invention to provide a steering stabilizing apparatus for a motor vehicle having bracketry which permits the installation thereof onto vehicles having a sway bar.

These and other objects, features and advantages of the present invention will become more readily apparent to those skilled in the art in the following more detailed description of the preferred embodiments of the present invention with reference to the accompanying drawings.

BRIEF DESCRIPTION OF THE DRAWINGS

FIG. 4 is a side elevational view of an alternate embodiment of the steering stabilizer apparatus according to the present invention showing its attachment to a vehicle tie bar and sway bar.

FIG. 5 is a side elevational view of another alternate embodiment of a steering stabilizer apparatus according to the present invention showing its attachment to a vehicle axle and tie bar.

DESCRIPTION OF THE PREFERRED EMBODIMENTS

Figure 3:
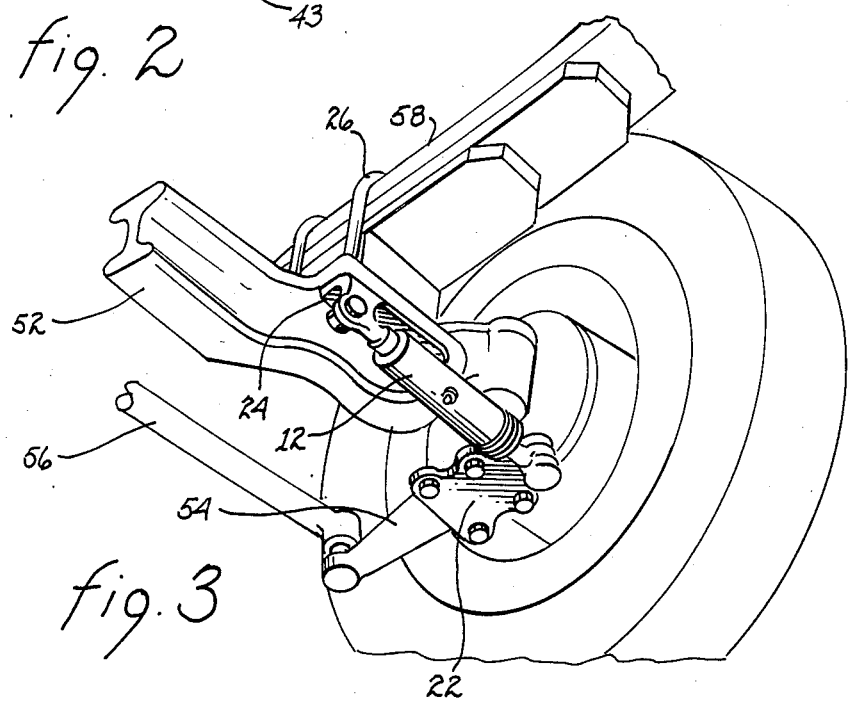
FIG. 3 is a perspective view f a steering stabilizing apparatus according to the present invention as viewed when attached to a motor vehicle.

Referring to the detailed drawings wherein like numerals designate like features, the steering stabilizing apparatus 10 according to the present invention is comprised of a generally tubular outer casing 10 having vehicle attaching means 22 and 24 operably coupled thereto. Vehicle attaching means 22 and 24 preferably consists of a plate member having a plurality of apertures passing therethrough for accommodating a plurality of U-bolts which are used to attach the plate member to the steering mechanism, as illustrated in FIG. 3, of the motor vehicle.

Figure 2:
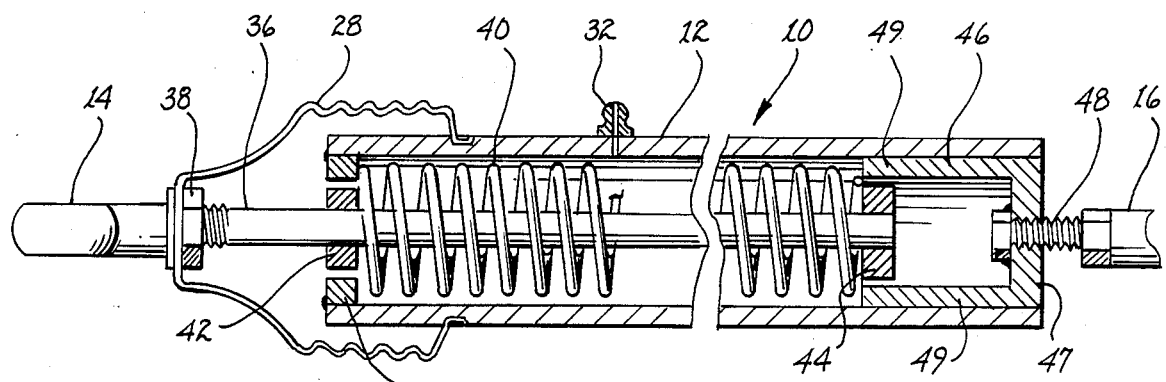
FIG. 2 is a side elevational cross-sectional view of a steering stabilizer according to the present invention.

The internal structure of the steering stabilizing apparatus is more particularly shown with reference to FIG. 2. In FIG. 2 there is shown a steering stabilizer apparatus 10 having a generally tubular outer casing 12. Compression spring means 40 is disposed within generally tubular outer casing 12 and internal shaft means 36 passes through the central channel formed by the coil of compression spring means 40. Compression spring means 40 is preferably a single spring, but may consist of two or more compression coil springs disposed in-line with respect to each other.

Compression spring means 40 is disposed within generally tubular outer casing 12 so that it is retained within the tubular outer casing 12 and compressed against spring seating flange 43 which is rigidly affixed within the inner circumference and at one end of generally tubular outer casing 12. Spring retention means 42 is disposed at a point along the length of internal shaft means 36 which aligns generally with spring seating flange 43. Spring retention means 42 may be a threaded nut, a ring collar having a retention pin passing through the collar and internal shaft means 36 or any other means suitable for retaining and compressing compression spring means 40 when internal shaft means 36 travels in a longitudinal direction. A second spring retention means 44 is provided at the opposite end of internal shaft means 36 and may be similarly configured so that longitudinal movement of internal shaft means 36 in an opposite direction compresses compression spring means 40.

Casing sealing means 46 is disposed within and and firmly affixed to the inner circumference of generally tubular casing 12 at an end opposite to that of spring seating flange 43. Casing sealing means further has spring seating members 49 integrally connected thereto, providing a surface against which compression spring means 40 may be compressed. Casing sealing means 46 has an end plate member 47 having an aperture passing therethrough for accepting a connecting means 48 which is, preferably, a machine bolt welded to end plate member 47 of spring retention means 46. Connecting means 48 serves to fixedly connect connection arm member 16 to steering stabilizing apparatus 10.

A second connection arm member 14 is provided which is operably coupled to internal shaft member 36 by coupling means 38. An accordion-like boot 28 is preferably provided to seal the operational parts from watr or dirt commonly encountered in driving. Steering stabilizing apparatus 10 may be provided with a grease nipple 32 which would permit compression spring means 40 and internal shaft member 36 to be packed in grease for smoother operation.

Figure 1:
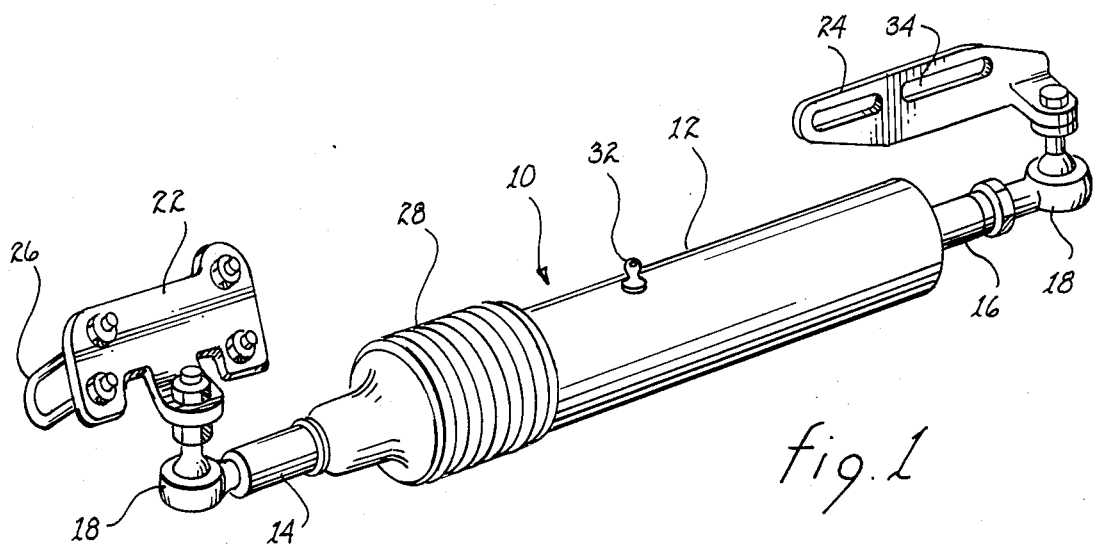
FIG. 1 is a perspective view of a steering stabilizing apparatus according to the present invention showing the steering stabilizer and associated bracketry for attachment to the motor vehicle.

Connection arm members 14 and 16 may, according to the present invention, be attached to swivel joints 18 as shown in FIG. 1 or may be attached to fixed joints 19 as shown in FIGS. 4 and 5. Irrespective of whether swivel joints 18 or fixed joints 19 are employed, these joints serve to connect steering stabilizing apparatus 10 to the bracketry which serves to connect the steering stabilizing apparatus to the steering system of the motor vehicle.

In FIGS. 3, 4 and 5 there are shown alternate embodiments steering stabilizing apparatus 10 adapted for different types of steering systems on different vehicles. With reference to Figure 3, there is shown the steering stabilizing apparatus depicted in FIG. 1 as it is attached to a steering system having a linkage arm 54, commonly known as a Pitman arm, operably coupled to tie rod 56. Linkage arm bracket 22 is attached to the linkage arm 54 by U-bolts 26. Axle bracket 24 is attached onto the U-bolts which serve to affix leaf springs 58 to solid axle 52, thereby effectively attaching axle bracket 24 to solid axle 52.

In operation, if a driver turns the steering wheel so that the wheel is "toe in" or towards the axle, spring retention means 42 causes inner shaft member 36 to be pushed longitudinally into generally tubular casing 12 thereby causing the compression of compression spring means 40 against spring retention means 46. The opposite expansion force of spring means 49 would then, in turn, cause compression spring means 40 to return to the neutral position. Conversely, if a driver turns the steering wheel so that the wheel is "toe out" or away from the axle, internal shaft member 36 is pulled longitudinally in a direction away from generally cylindrical casing 12 thereby causing second spring retention means 44 to compress compression spring means 40 against spring seating flange 43.

In FIG. 4 there is shown a steering stabilizing apparatus 10 as it is installed onto a vehicle having a tie and sway bar steering arrangement. In FIG. 5 there is shown a steering stabilizing apparatus 10 as installed onto a vehicle having a solid axle and a tie bar steering arrangement. As shown, steering stabilizing apparatus is attached to sway bar 64 by bracket plate 66. Bracket plate 66 is operably secured to clamping means 68 for securing bracket plate 66 to sway bar 64 as shown in FIG. 4 of to tie rod 60 as shown in FIG. 5. First bracket plate 66 is coupled to internal shaft member 14 by fixed joint 19, however, swivel joint 18 may also be employed. Second bracket plate 70 is attached to connection arm member 16 of steering stabilizing apparatus 10. Second bracket plate 70 is, in turn, attached by means of U-bolts 26 in either solid axle 62 as shown in FIG. 5 or to tie rod 60 as shown in FIG. 4.

Thus, it is apparent that there has been provided, in accordance with the present invention and the preferred embodiments thereof, a steering stabilizing apparatus which meets and achieves the objects and advantages set forth herein. The invention has been particularly described and illustrated with reference to certain embodiments thereof, but it is not intended that the invention be strictly limited to these embodiments. Those having ordinary skill in the art will recognize that variations and modifications differing from these embodiments, but falling within the spirit and scope of the invention, are possible. Other materials or configurations, for example, are contemplated by the present invention. All such variations and modifications as fall within the appended claims are therefore considered within the scope of the invention.

I claim:

1. A steering stabilizing apparatus, comprising:
a generally tubular hollow casing member having openings at both ends of casing member;
an axially reciprocating internal shaft member disposed within said generally tubular hollow casing member and extending therefrom;
compression spring means surrounding said internal shaft member and disposed within said generally tubular hollow casing member for imparting resistive force to longitudinal movement of said internal shaft member;
spring seating means disposed within the inner circumference and at each end of said casing member for seating said compression spring means within said generally tubular hollow casing member and sealing each end of said generally tubular hollow casing member; and
a plurality of spring retention means operably coupled to said internal shaft member, one of said spring retention means being operably coupled to the end of said internal shaft member which is disposed within said generally tubular hollow casing member and another of said spring retention means being operably coupled to a point along the length of said internal shaft member.

2. The steering stabilizer apparatus according to claim 1, wherein said generally tubular hollow casing member further comprises means for introducing grease into said casing member.

3. The steering stabilizing apparatus according to claim 1, wherein said generally tubular hollow casing member further comprises covering means for covering the end of said casing member into which said internal shaft member extends.

4. The steering stabilizing apparatus according to claim 1, wherein said internal shaft member further comprises a plurality of apertures passing diagonally therethrough for receivably coupling a retaining pin.

5. The steering stabilizing apparatus according to claim 4, wherein said spring retention means further comprises a retaining member having a generally diagonal aperture passing therethrough for receivably coupling said retaining pin and concentrically coupled onto said internal shaft member.

6. The steering stabilizing apparatus according to claim 1, wherein said internal shaft member further comprises an externally threaded surface disposed at one end of said shaft member and an externally threaded surface disposed at a point along the length of said shaft member and generally corresponding to the end opening of said casing member into which said shaft member is disposed.

7. The steering stabilizing apparatus according to claim 6, wherein said spring retention means further comprises an internally threaded nut-like member for screwably coupling said externally threaded surfaces of said internal shaft member.

8. The steering stabilizing apparatus according to claim 1, wherein said compression spring means further comprises a compression spring.

9. The steering stabilizing apparatus according to claim 1, wherein said compression spring means further comprises a plurality of compression springs disposed in-line with respect to each other.

10. The steering stabilizing apparatus according to claim 1, wherein said spring seating means further comprises a flange recievably and concentrically coupled within the end of said casing member into which said internal shaft member is disposed and having an shaft internal member receiving aperture passing therethrough, said spring seating means further comprising a generally tubular sealing member receivably and concentrically coupled within the other end of said casing member.

11. The steering stabilizing apparatus according to claim 10, wherein said generally tubular sealing member further comprises an generally central aperture passing therethrough for receivably coupling means for connecting the steering stabilizing apparatus to a motor vehicle.

12. A steering stabilizer apparatus for a motor vehicle, comprising in combination:
a piston-like member comprising:
a generally tubular hollow casing member having openings at both ends of said casing member;
internal shaft member disposed within said generally tubular hollow casing member and extending therefrom;
compression spring means surrounding said internal shaft member and disposed within said generally tubular hollow casing member for imparting resistive force to longitudinal movement of said internal shaft member;
spring seating means disposed within the inner circumference and at each end of said casing member for seating said compression spring means within said generally tubular hollow casing member and sealing each end of said generally tubular hollow casting member, one of said spring seating means being disposed at a fixed end of said generally tubular hollow casing member and a second of said spring seating means having an aperture passing therethrough for receivably and rigidly connecting said generally tubular casing member to a motor vehicle, said second spring seating means being disposed at another end of said generally tubular hollow casing member; and
a plurality of spring retention means operably coupled to said internal shaft member, one of said spring retention means being operably coupled to the end of said internal shaft member which is disposed within said generally tubular hollow casing member and another of said spring retention means being operably coupled to a point along the length of said internal shaft member;
a connection arm member coupled to said internal shaft member;
a second connection arm member rigidly coupled to said second spring seating means; and
vehicle bracket means operably coupled to each of said connection arm member and said second connection arm member for attaching the steering stabilizing apparatus to a motor vehicle.

13. The steering stabilizing apparatus according to claim 12, wherein said generally tubular hollow casing member further comprises means for introducing grease into said casing member.

14. The steering stabilizing apparatus according to claim 12, wherein said generally tubular hollow casing member further comprises covering means for covering the end of said casing member into which said internal shaft member extends.

15. The steering stabilizing apparatus according to claim 12, wherein said internal shaft member further comprises a plurality of apertures passing diagonally therethrough for receivably coupling a retaining pin.

16. The steering stabilizing apparatus according to claim 15, wherein said spring retention means further comprises a retaining member having a generally diagonal aperture passing therethrough for receivably coupling said retaining pin and concentrically coupled onto said internal shaft member.

17. The steering stabilizing apparatus according to claim 12, wherein said internal shaft member further comprises an externally threaded surface disposed at one end of said shaft member and an externally threaded surface disposed at a point along the length of said shaft member and generally corresponding to the end opening of said casing member into which said shaft member is disposed.

18. The steering stabilizing apparatus according to claim 17, wherein said spring retention means further comprises an internally threaded nut-like member for screwably coupling said externally threaded surfaces of said internal shaft member.

19. The steering stabilizing apparatus according to claim 12, wherein said compression spring means further comprises a compression spring.

20. The steering stabilizing apparatus according to claim 12, wherein said compression spring means further comprises a plurality of compression springs disposed in-line with respect to each other.

21. The steering stabilizing apparatus according to claim 12, wherein said spring seating means further comprises a flange receivably and concentrically coupled within the end of said casing member into which said internal shaft member is disposed and having an shaft member receiving aperture passing therethrough, said spring seating means further comprising a generally tubular sealing member receivably and concentrically coupled within the other end of said casing member.

22. The steering stabilizing apparatus according to claim 21, wherein said generally tubular sealing member further comprises an generally central aperture passing therethrough for receivably coupling means for connecting the steering stabilizing apparatus to a motor vehicle.

* * * * *